United States Patent Office 3,195,549
Patented July 20, 1965

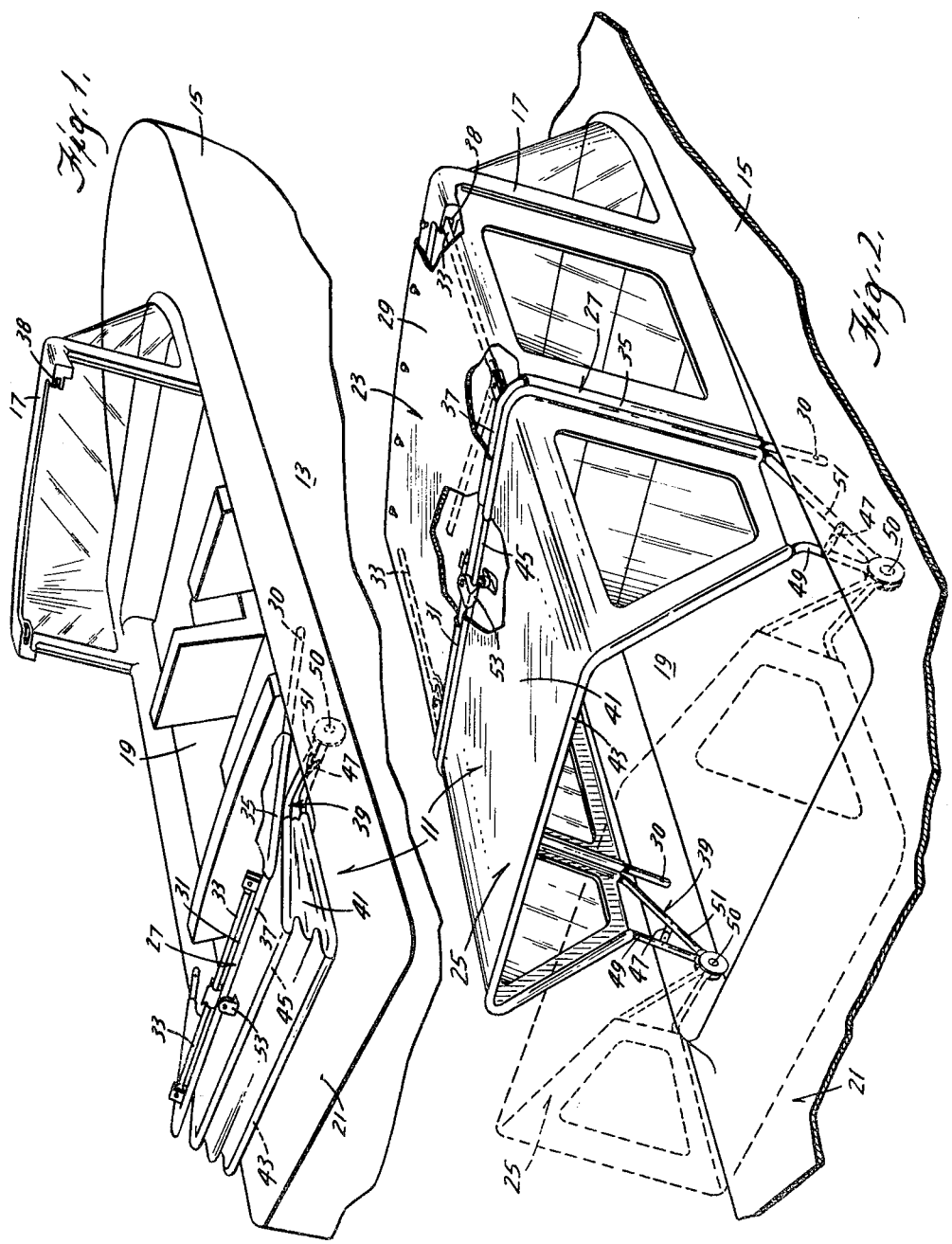

3,195,549
FOLDING SOFT TOP
Myron T. Stevens, Kenosha, Wis., assignor to Outboard Marine Corporation, Waukegan, Ill., a corporation of Delaware
Filed Feb. 23, 1962, Ser. No. 174,977
14 Claims. (Cl. 135—6)

The invention relates to convertible tops for vehicles and, more particularly, to a folding soft top for a boat.

The invention provides a foldable, two part top for a boat or other vehicle. The rearward part includes a pair of pivotally mounted frame members which are fixable by brace means in erected angular relation to each other and, when the top is erected, is pivotally shiftable between a normal position in covering relation to the after part of the cockpit or passenger well of the boat and a second, rearwardly located position facilitating ease of entry into the after part of the passenger well. The rearward part is retainable in its normal position by attachment to a frame member incorporated in the forward part, whereby there is formed a self-standing structure regardless of whether the forward part is or is not erected.

The forward part can be retained in an erected condition in covering relation to the forward part of the passenger well independently of the rearward part by connection to support means on the boat, such as the windshield, of a brace or support rod extending pivotally from the before-mentioned frame member.

In general the object of the invention is the provision of an improved convertible top for a vehicle. A more specific object of the invention is the provision of a boat incorporating such an improved folding top. Other objects and advantages of the invention will become known by reference to the following description and the accompanying drawing of one embodiment of the invention.

FIGURE 1 is a fragmentary perspective view, partially broken away, of a boat embodying a convertible top in accordance with the invention, the top being shown in its folded or storage position; and FIGURE 2 is a partially broken away fragmentary perspective view, on a somewhat enlarged scale, of the boat shown in FIGURE 1, with the folding top shown in its erected, covering relation to the cockpit or passenger well of a boat.

The folding top 11 illustrated in the drawings is shown mounted on a vehicle in the form of a boat 13 of generally conventional construction including a hull 15, a windshield frame 17, a cockpit or passenger well 19, and a rearward deck 21 which may incorporate a recess (not shown) for stowage of the folding top 11 when in its collapsed condition. The folding top 11 comprises a first section or forward part 23 and a second section or rearward part 25.

More specifically, the forward part 23 comprises an erectable frame 27 and a cover 29 which is removably attached to the frame 27. The frame 27 includes a frame member which, in the disclosed construction, takes the form of an inverted U shaped bow 31, and which is pivotally carried by suitable means 30 on the hull 15, together with at least one brace or support rod 33. The bow 31 is disposable in either of a generally upright, erected position, and a rearwardly extending, generally horizontal, folded position. In the disclosed construction, two braces, struts, or rods 33 are employed and each of the rods 33 is pivoted at one end to the bow 31 adjacent one of the bends between the upright legs 35 of the bow and the crossbar 37. Each rod 33 is movable between a retracted or folded position in generally parallel relation to the crossbar 37, and a forwardly extending position in generally perpendicular relation to the crossbar. When in their forward positions, the forward ends of the rods are releasably securable, to the top of windshield frame 17, by suitable means such as the laterally inwardly opening grooves 38 which receive the forward ends of the rods 33 in releasable frictional engagement. When the rods 33 are secured to the windshield frame 17, the bow 31 is held in its erected position, independently of the position of the rearward top section.

The cover 29 includes along its forward margin suitable means for releasable connection with the top and sides of the windshield frame 17.

The rearward part 25 of the folding soft top 11 also includes a support frame 39 and a cover 41 which is removably carried by the frame. The frame 39 includes a pair of frame members, specifically, an afterbow 43, and an intermediate bow 45 located between the afterbow 43 and the bow 31. In addition, brace means 47 are provided for releasably fixing the afterbow 43 in relation to the intermediate bow 45 so as to establish the rearward part 25 in an expanded or erected condition with the cover 41 stretched between the after and intermediate bows 43 and 45 respectively. The afterbow 45 is pivotally mounted at the ends of its legs 49 to suitable support means 50 on the boat hull 15 at a point located rearwardly of, and somewhat below, the pivotal mounting of the bow 31. The legs 49 are bent, as shown in FIGURE 1, to provide an increased amount of fore and aft displacement incident to pivoting of the erected rearward part 25.

The intermediate bow 45 is pivotally mounted to the boat hull 15 at the ends of its legs 51 by suitable support means which, in the disclosed construction, also serve to support the afterbow 43. The legs 51 are bent so that a major portion thereof lie in adjacent parallel relation to the legs 35 of the bow 31 when the crossbars of the bows 31 and 45 are also in adjacent parallel relation.

Any suitable releasable brace means can be provided between the after and intermediate bows 43 and 45, such as for example, a locking knee brace 47.

When the after and intermediate bows 43 and 45 are in their erected condition relative to each other, the rearward part 25 of the folding top 11 is shiftable between a normal position covering the after part of the passenger well 19 and a rearwardly located position, generally clear of the passenger well. The rearward part 25 is maintained in its normal position with the intermediate bow 45 in parallel, adjacent relation to the bow 31, by attachment of the bows 45 and 31, regardless of whether the forward top part is erected or is not erected. Various latch means 53 can be employed to connect the bows 45 and 31. The disclosed latch is a manually operable friction latch. When stowing the folding top from its fully erected condition, the latch 53 is released, the rearward part 25 is swung to its rearward position, and the brace means 47 is released, permitting pivoting of the intermediate bow 45 into proximate relation to the afterbow 43. Subsequently, the cover 29 and the rods 33 are detached from the windshield frame 17, the rods 33 being swung into their folded position, and the bow 31 is rocked rearwardly into proximate relation to the afterbow 43 and the intermediate bow 45. The covers 29 and 41 are stowed in adjacent relation to the supporting bows.

Various of the features of the invention are set forth in the following claims.

What is claimed is:
1. A folding top for a vehicle body comprising a first frame member including means at one end for pivotal mounting thereof to a vehicle body, a second frame member including means at one end for pivotal mounting thereof to a vehicle body, a third frame member including means at one end for pivotal mounting thereof to a vehicle body, means joining said means at one end of each of said second and third frame members for pivotal movement about a common axis in spaced relation to said one end of said first frame member, brace means for connecting said second and third frame members in releasably fixed relation to each other whereby, when said second and third frame members are mounted on the vehicle body, said second and third frame members are retainable in an expanded condition relative to each other, and means on said first and second frame members for releasable attachment in fixed relation to each other whereby, when said means at one end of each of said first and second frame members are mounted on the vehicle body in spaced relation to each other, said first and second frame members are retainable in an erected condition relative to the vehicle body.

2. A folding top in accordance with claim 1 wherein each of said first, second and third frame members constitutes a "U" shaped bow, and said bows each include, at each end, means for pivotal mounting thereof to a vehicle body.

3. A folding top in accordance with claim 1 including a strut pivotally attached to said first frame member for disposition between a folded position in generally parallel relation to said first frame member and an erected position in outwardly extending relation to said first frame member.

4. The combination of a boat hull, a forwardly disposed folding top section including a forwardly located frame member pivoted at one end to said boat hull, a rearwardly disposed folding top section including a rearwardly located frame member, an intermediate frame member located between said forward and rearward frame members, means pivotally mounting one end of each of said rearward and intermediate frame members to said boat hull about a common pivot in rearwardly spaced relation to the pivotal connection of said forwardly located frame member to said hull, and brace means for releasably fixing the angular relation between said rearward and intermediate frame members whereby said rearward folding top section is retainable in an expanded condition, and means for releasably attaching said intermediate frame member in fixed relation to said forward frame member whereby said forward and intermediate frame members are retainable in erected relation to said boat hull.

5. The combination of a boat hull and a folding top comprising a first folding top section mounted on said boat hull and including means for disposing said first top section between an erected condition and a folded condition, releasably engageable means on said boat hull and on said first folding top section for maintaining said first top section in erected condition, a second folding top section including frame members shiftable between an expanded condition and a folded condition, releasable means for maintaining said frame members in said expanded condition, and means mounting said second top section on said boat hull for movement of said second top section relative to a position in covering relation to said boat hull while said frame members are maintained in said expanded condition by said releasable means.

6. The combination of a boat hull and a folding top including a folding top section mounted on said boat hull and including frame members disposable between a folded condition and an expanded condition, releasable means for maintaining said frame members in said expanded condition, means mounting said top section on said boat hull for movement of said top section to and from a first position in covering relation to said boat hull and a second position displaced substantially from said first position while said frame members are maintained in said expanded condition by said releasable means, and means for maintaining said top section in said first position including a leg, means mounting said leg on said boat hull for movement to a position in at least partially adjacent relation to a part of one of said frame members, and means on said leg and on said one frame member for direct interconnection therebetween.

7. The combination of a boat hull and a folding top including a rearwardly located folding top section including frame members disposable between a folded condition and an expanded condition, releasable means for maintaining said frame members in said expanded condition, means mounting said rearwardly located section on said boat hull for movement of said rearwardly located top section to and from a position in covering relation to said boat hull while said frame members are maintained in said expanded condition by said releasable means, and means for maintaining said rearwardly located top section in said covering position including a leg, means mounting said leg on said boat hull for movement to a position in at least partially adjacent relation to a part of one of said frame members, and means on said leg and on said one frame member for direct interconnection therebetween, said folding top also including a forwardly located folding top section disposable between an erected condition and a folded condition, said forwardly located folding top section including said leg, and releasably engageable means on said boat hull and on said forwardly located folding top section for maintaining said forwardly located section in erected condition, said leg being located in said position in adjacent relation to said part of said one of said frame members when said forwardly located folding top section is in its erected condition.

8. The combination of a boat hull and a folding top comprising a rearwardly located folding top section mounted on said boat hull and including frame members disposable between a folded condition and an expanded condition in covering relation to said boat hull, means for maintaining said rearwardly located top section in said covering relation including a leg, means mounting said leg on said boat hull for movement to a position in at least partially adjacent relation to a part of one of said frame members, and means on said leg and on said one frame member for direct interconnection therebetween, a forwardly located top section disposable between an erected condition and a folded condition, said forwardly located top section including said leg, releasable engageable means on said boat hull and on said forwardly located folding top section for maintaining said forwardly located section in erected condition, said leg being displaceable about said means mounting said leg to said position in partially adjacent relation to said part of said one of said frame members independently of the erection of said forwardly located folding top section and also being located in said position in partially adjacent relation to said part of said one of said frame members when said forwardly located folding top section is in its erected condition.

9. A folding top adapted to be mounted on a vehicle, said folding top comprising a first folding top section and a second folding top section, said first folding top section including means for mounting said first folding top section on a vehicle for displacement between a folded condition and an erected condition, and means fixable relative to the vehicle for maintaining said first top section in said erected condition in covering relation to the vehicle, said second folding top section including releasable means for maintaining said second folding top section in an expanded condition, means for mounting said second folding top section on a vehicle to afford displacement of said second folding top section relative to a position in covering relation to the vehicle while maintaining said second folding top section in expanded condition by said releasable means, and means for maintaining said second top section, when in said expanded condition, in said covering position relative to the vehicle independently of complete erection of said first top section.

10. A folding top adapted to be mounted on a vehicle, said folding top comprising a first folding top section and a second folding top section, said first folding top section including means for mounting said first folding top section on a vehicle for displacement between a folded condition and an erected condition, and means fixable relative to the vehicle for maintaining said first top section in said erected condition in covering relation to the vehicle, said second folding top section including releasable means for maintaining said second folding top section in an expanded condition, means for mounting said second folding top section on a vehicle to afford displacement of said second folding top section relative to a position in covering relation to the vehicle while maintaining said second folding top section in expanded condition by said releasable means, and means for releasably securing said first and second top sections together in adjacent relation to each other when said first top section is in erected condition.

11. A folding top adapted to be mounted on a vehicle, said folding top comprising a first folding top section and a second folding top section, said first folding top section including a frame member, means for mounting said first folding top section on a vehicle for displacement between a folded condition and an erected condition in covering relation to the vehicle and including means mounting said frame member for movement between a folded condition and an erected condition, means fixable relative to the vehicle for maintaining said first top section and said frame member in said erected conditions, said second folding top section including releasable means for maintaining said second folding top section in an expanded condition, means for mounting said second folding top section on a vehicle to afford displacement of said second folding top section relative to a position in covering relation to the vehicle while maintaining said second folding top section in expanded condition by said releasable means, and means for maintaining said second top section, when in said expanded condition, in said covering position relative to the vehicle body independently of the complete erection of said first top section, including means releasably securing said frame member, when in said erected condition, to said second top section.

12. A folding top adapted to be mounted on a vehicle body, said folding top comprising a first folding top section and a second folding top section, said first folding top section including a frame member, means for mounting said first folding top section on a vehicle for displacement between a folded condition and an erected condition in covering relation to the vehicle and including means mounting said frame member for movement between a folded condition and an erected condition, a strut pivotally mounted on said frame member for movement between a folded position in generally parallel relation thereto and an erected position in transverse relation thereto, and means on said strut for releasable engagement with the vehicle for maintaining said first top section and said frame member in said erected conditions, said second folding top section including releasable means for maintaining said second folding top section in an expanded condition, means for mounting said second folding top section on a vehicle to afford displacement of said second folding top section relative to a position in covering relation to the vehicle while maintaining said second folding top section in expanded condition by said releasable means, and means for maintaining said second top section, when in said expanded condition, in said covering position relative to the vehicle body independently of the complete erection of said first top section, including means releasably securing said frame member, when in said erected condition, to said second top section.

13. The combination of a boat hull, a forwardly disposed folding top section including a forwardly located frame member pivoted at one end to said boat hull, means for retaining said forward frame member in erected relation to said boat hull comprising a strut pivotally attached at one end to said forward frame member for movement between a folded position in generally parallel relation to said forward frame member and an erected position in outwardly extending relation to said forward frame member and means on said boat hull for releasably engaging the outer end of said strut when in said erected position, thereby to maintain said forward frame member in erected relation to said boat hull, a rearwardly disposed folding top section including a rearwardly located frame member, an intermediate frame member located between said forward and rearward frame members, means pivotally mounting one end of each of said rearward and intermediate frame members to said boat hull about a common pivot in rearwardly spaced relation to the pivotal connection of said forwardly located frame member to said hull, brace means for releasably fixing the angular relation between said rearward and intermediate frame members whereby said rearward folding top section is retainable in an expanded condition and means for releasably attaching said intermediate frame member in fixed relation to said forward frame member, whereby said forward frame member is retainable in erected relation to said boat hull independently of said first mentioned means for retaining said forwardly located frame member in erected relation to said boat hull and whereby said intermediate frame member is retainable in erected relation to said boat hull.

14. The combination of a boat hull, a forwardly disposed folding top section including a forwardly located frame member comprising an inverted U-shaped bow pivotally mounted at each end to said boat hull, a rearwardly disposed folding top section including a rearwardly located frame member comprising an inverted U-shaped bow member, an intermediate frame member located between said forward and rearward frame members and comprising an inverted U-shaped bow, means pivotally mounting adjacent ends of each of said rearward and intermediate frame members to said boat hull about common pivots in rearwardly spaced relation to the pivotal mountings of said forwardly located frame member to said hull, brace means for releasably fixing the angular relation between said rearward and intermediate frame members whereby said rearward folding top section is retainable in an expanded condition, and means for releasably attaching said intermediate frame member in fixed relation to said forward frame member whereby said forward and intermediate frame members are retainable in erected relation to said boat hull.

References Cited by the Examiner

UNITED STATES PATENTS

| 212,282 | 2/79 | Swift | 296—114 |
| 739,389 | 9/03 | Castle | 135—6 |
| 841,719 | 1/07 | Ross | 135—6 |
| 988,204 | 3/11 | Mitchell | 296—114 |
| 1,249,208 | 12/17 | Russell | 296—107 |
| 1,269,073 | 6/18 | Gillette | 296—114 |
| 1,682,027 | 8/28 | Zimmermann et al | 135—6 |
| 2,159,309 | 5/39 | Betourne | 135—4 |

FOREIGN PATENTS 486,376 11/53 Italy.

OTHER REFERENCES

"Taylor Made," copyright 1960, page 14, a brochure of N. A. Taylor Co.

HARRISON R. MOSELEY, *Primary Examiner.*

MILTON BUCHLER, *Examiner.*